April 2, 1929.  J. C. McCUNE  1,707,273
ANGLE COCK DEVICE
Filed Jan. 4, 1928
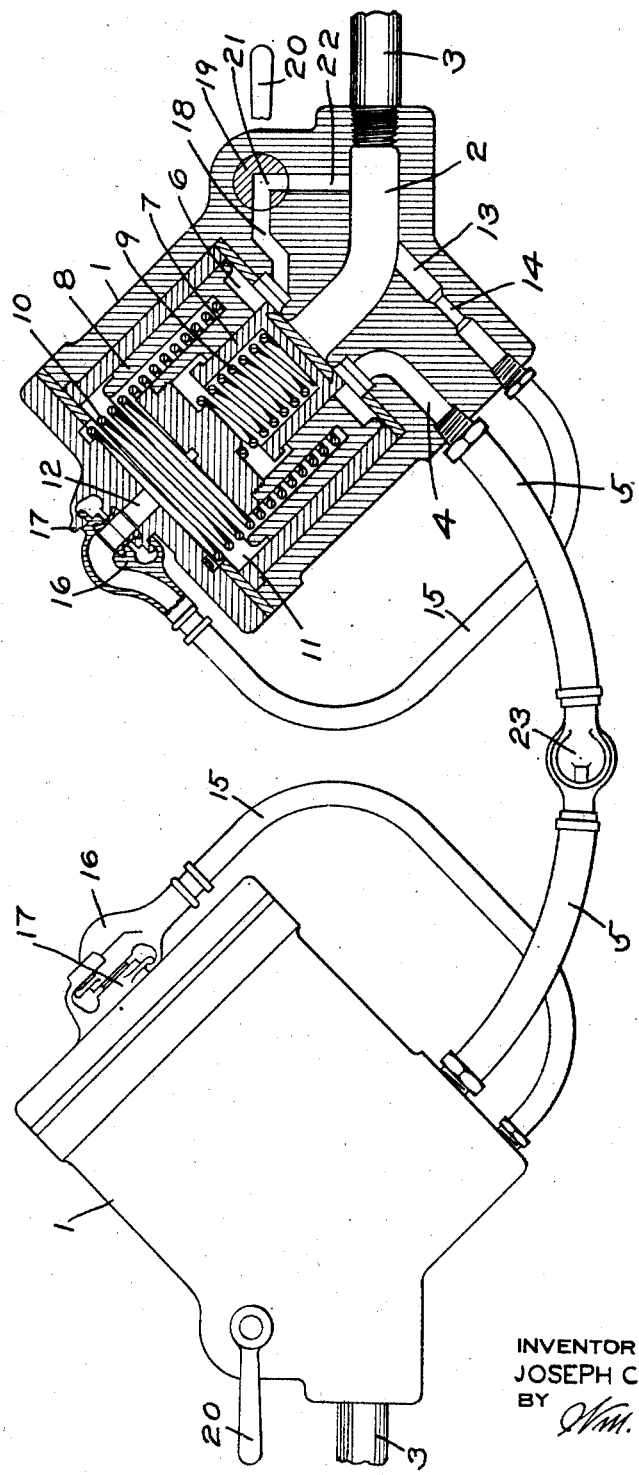
INVENTOR
JOSEPH C McCUNE
BY *Wm. M. Cady*
ATTORNEY Patented Apr. 2, 1929.

1,707,273

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed January 4, 1928. Serial No. 244,427.

This invention relates to fluid pressure brakes, and more particularly to an angle cock device for controlling communication through the brake pipe at the end of a car.

The principal object of my invention is to provide an angle cock device having improved means for maintaining communication through the brake pipe in case an angle cock should be accidentally or maliciously turned to its closed position and in which a car having a charged brake pipe may be connected to a car having an uncharged brake pipe without causing an emergency application of the brakes.

In the accompanying drawing, the single figure is an elevational view of two connected angle cock devices embodying my invention, one of the angle cock devices being shown in section.

As shown in the drawing, the angle cock device may comprise a casing 1 having a passage 2 connected to the brake pipe 3 and a passage 4 connected to the usual flexible hose 5. Passage 2 opens into a chamber 6 and communication from said passage to said chamber is controlled by a piston valve 7. Said valve is mounted in a piston 8 and is subject to the pressure of a spring 9. Piston 8 is subject to the pressure of a coil spring 10 contained in chamber 11.

A passage 12 leads from chamber 11 and is adapted to be connected to passage 2 through a passage 13 having a restricted portion 14, and a flexible hose 15 having a hand operated coupling 16 at the outer end which is adapted to be coupled to a counterpart coupling position 17 at the outlet of passage 12.

Passage 4 opens into chamber 6 and also opening into said chamber is a passage 18 which leads to a plug valve 19, having an operating handle 20. In the position shown in the drawing, a cavity 21 in said valve connects passage 18 with a passage 22, leading to passage 2.

In operation, when it is desired to connect a car having its brake pipe charged with fluid under pressure to a car having an uncharged brake pipe, the usual hose couplings 23 at the end of the flexible hose 5 of each car are coupled together and the special hose coupling 16 is connected to the coupling portion 17 on each car.

Assuming the angle cock device at the right of the drawing to be on the car having the charged brake pipe, the plug valve 19 on this car is turned to the position shown, so that fluid under pressure is supplied from passage 2 to chamber 6 at a rate determined by the flow area of cavity 21, which is less than the rate necessary to effect an emergency reduction in brake pipe pressure.

Passage 2 being connected to passage 12 through the flexible hose 15, the fluid pressure in chamber 11 at one side of piston 8 is equal to the fluid pressure in passage 2, and consequently the fluid pressure in chamber 11 plus the pressure of spring 10 ensures that the piston 8 will be held seated in the position shown in the drawing, so that the valve 7 is held seated, closing direct communication from passage 2 to passage 4.

When the pressure in the uncharged brake pipe has been built up substantially to the pressure in the charged portion of the brake pipe, the special hose coupling 16 of each angle cock device is uncoupled from the corresponding coupling portion 17 and the coupling heads 16 of the adjacent cars are coupled together.

The chamber 11 of each angle cock device being now open to the atmosphere through the passage 12, the piston 8 and the valve 7 will be shifted outwardly, opening direct communication from passage 2 to passage 4. It will thus be seen that with the above described construction, a car having a charged brake pipe may be coupled to a car having an uncharged brake pipe, without causing an emergency application of the brakes.

In uncoupling, the plug valve 19 on each car is turned to its closed position, and then the special hose couplings 16 are uncoupled. The escape of fluid through the hose coupling 16 to the atmosphere will be small, due to the passage 13 being provided with a restricted portion 14.

The coupling head 16 of each angle cock device is then coupled to the corresponding coupling portion 17. The fluid pressures on opposite sides of the piston 8 then quickly equalize, permitting the spring 10 to force the piston 8 to its seat as well as the valve 7. After the valve 7 has been seated, the usual hose couplings 23 may be separated.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake pipe, of a valve for controlling communication from the brake pipe side of the valve to the flexible hose side, a piston for operating said valve, and manually detachable means for connecting one side of said piston to the brake pipe side of said valve.

2. The combination with a brake pipe, of a valve for controlling communication from the brake pipe side of the valve to the flexible hose side, a piston for operating said valve, manually detachable means for connecting one side of said piston to the brake pipe side of said valve, and a manually operable valve for supplying fluid from the brake pipe to the flexible hose at a restricted rate.

3. The combination with a brake pipe, of a main valve for controlling communication from the brake pipe side of said valve to the other side, a piston for operating said valve, and a manually operable valve for connecting one side of the main valve to the other side through a restricted port.

4. The combination with a brake pipe, of a main valve for controlling communication from the brake pipe side of said valve to the other side, a piston for operating said valve, a flexible hose connected to the brake pipe side of the valve, and a detachable coupling connected to said hose for connecting the brake pipe side of the valve to one side of said piston.

5. The combination with a brake pipe, of a main valve for controlling communication from the brake pipe side of said valve to the other side, a piston for operating said valve, a flexible hose connected to the brake pipe side of the valve having a hose coupling adapted to be connected to a corresponding hose coupling of an adjacent car, and a coupling portion to which said hose coupling may be connected to establish communication from the brake pipe side of the valve to one side of said piston.

6. The combination with a brake pipe and a flexible hose connected to said brake pipe, of a main valve for controlling a main communication from the brake pipe side of the valve to the flexible hose side, a piston for operating said valve, a by-pass for connecting the brake pipe side of the main valve to the flexible hose side, a manually operable valve for controlling communication through said by-pass, and manually detachable means for connecting the brake pipe side of said main valve to one side of said piston.

In testimony whereof I have hereunto set my hand.

JOSEPH C. McCUNE.